United States Patent
Chang et al.

(10) Patent No.: US 10,969,606 B2
(45) Date of Patent: Apr. 6, 2021

(54) WEARABLE DEVICE

(71) Applicant: Quanta Computer Inc., Taoyuan (TW)

(72) Inventors: Jung-Wen Chang, Taoyuan (TW); Wan-Chi Lin, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 121 days.

(21) Appl. No.: 16/293,132

(22) Filed: Mar. 5, 2019

(65) Prior Publication Data

US 2020/0133020 A1 Apr. 30, 2020

(30) Foreign Application Priority Data

Oct. 31, 2018 (TW) .................................. 107138670

(51) Int. Cl.
*G02C 5/14* (2006.01)
*G02C 5/18* (2006.01)
*G02C 11/04* (2006.01)

(52) U.S. Cl.
CPC ............... *G02C 5/143* (2013.01); *G02C 5/18* (2013.01); *G02C 11/04* (2013.01)

(58) Field of Classification Search
CPC ........ G02C 5/143; G02C 3/003; G02C 11/00; G02C 11/10; G02C 5/16; G02C 5/20; G02C 3/006; G02C 11/02; G02C 2200/08; G02C 2200/02; G02C 2200/16; G02C 5/00; G02C 5/14; G02C 5/008; G02C 5/02; G02C 5/146; G02C 5/2272; G02C 2200/10; G02C 5/001; G02C 5/006; A61F 11/12; A61F 9/027; A61F 9/029; A61F 11/08; A61F 2210/0014; A61F 9/028; A61F 9/045; A61F 11/14; G02B 27/017; G02B 2027/0138; G02B 2027/0118; G02B 2027/014; G02B 2027/0178; G02B 27/0176

See application file for complete search history.

(56) References Cited

U.S. PATENT DOCUMENTS

| 6,193,368 B1 * | 2/2001 | George | G02C 5/00 351/111 |
| 2013/0250232 A1 * | 9/2013 | Belbey | H05K 7/12 351/158 |
| 2014/0253868 A1 * | 9/2014 | Jannard | H04R 1/1066 351/158 |

(Continued)

FOREIGN PATENT DOCUMENTS

| CN | 2816846 Y | 9/2006 |
| CN | 201707506 U | 1/2011 |

(Continued)

*Primary Examiner* — William R Alexander
*Assistant Examiner* — Sharrief I Broome (57) ABSTRACT

A wearable device includes a casing member, a lifting assembly, an elastic element, and a pressing member. The casing member has a supporting portion. The lifting assembly is housed in the casing member and is liftable above the casing member. The elastic element is connected to the casing member and the lifting assembly. The pressing member faces toward the supporting portion. The pressing member is movably connected to the lifting assembly and is configured to move along with the lifting assembly, whereby the temple is capable of being clamped between the pressing member and the supporting portion.

9 Claims, 5 Drawing Sheets

(56) References Cited

U.S. PATENT DOCUMENTS

2014/0345090 A1* 11/2014 Wang ................ G02F 1/133528
24/303
2015/0261015 A1* 9/2015 Han .................. G02B 27/0176
351/158
2018/0143458 A1* 5/2018 Blum .................. H04N 5/2251

FOREIGN PATENT DOCUMENTS

| CN | 104238148 A | 12/2014 |
| CN | 206348548 U | 7/2017 |
| CN | 206348554 U | 7/2017 |
| CN | 207992603 U | 10/2018 |
| TW | M563562 U | 7/2018 |

* cited by examiner

WEARABLE DEVICE

CROSS-REFERENCE TO RELATED APPLICATION

This application claims priority to Taiwan Application Serial Number 107138670, filed Oct. 31, 2018, which is herein incorporated by reference.

BACKGROUND

Field of Invention

The present disclosure relates to a wearable device. More particularly, the present disclosure relates to a wearable device that can be attached to a pair of glasses.

Description of Related Art

The application of wearable devices on the human body has been expanded along with advancement in technology. For example, a wearable device can be attached to a user's glasses and performs some functions and operations, such as multimedia functions, recording, photographing and/or lighting.

However, glasses may come in various designs and sizes. Accordingly, if the wearable device is not firmly attached to the glasses, the wearable device is likely to tremble, shift, or even separate from the glasses under an external force.

SUMMARY

One embodiment of the present disclosure provides a wearable device. The wearable device can be attached to a temple of a pair of eyeglasses. The wearable device comprises a casing member, a lifting assembly, an elastic component, and a pressing member. The casing member has a supporting portion. The lifting assembly is housed in the casing member and is liftable above the casing member. The casing member and the lifting assembly are connected by the elastic component. The pressing member faces toward the supporting portion. The pressing member is movably connected to the lifting assembly and is configured to move along with the lifting assembly, whereby the temple is capable of being clamped between the pressing member and the supporting portion.

According to one or more embodiments of the present disclosure, the lifting assembly of the wearable device includes a pivot. The pivot is connected to a side of the lifting assembly. The pressing member is rotatably connected to the lifting assembly via the pivot. An axial direction of the pivot is orthogonal to a lifting direction of the lifting assembly.

According to one or more embodiments of the present disclosure, the wearable device further comprises a torsional spring. The pressing member has a first end and a second end opposite thereto. The first end of the pressing member is rotatably connected to the lifting assembly via the pivot. The torsional spring coils around the pivot and connects the lifting assembly to the first end of the pressing member. The axial direction of the pivot is orthogonal to a longitudinal direction of the pressing member.

According to one or more embodiments of the present disclosure, the pressing member of the wearable device is slidably connected to the lifting assembly, such that the pressing member is laterally slidable relative to the lifting assembly.

According to one or more embodiments of the present disclosure, the pressing member of the wearable device is slidably connected to the pivot of the lifting assembly, such that the pressing member is laterally slidable along the axial direction of the pivot.

According to one or more embodiments of the present disclosure, the pressing member of the wearable device has a sleeve coupling with a chute, and the pivot is slidably located in the chute.

According to one or more embodiments of the present disclosure, the wearable device further comprises a nut. The pivot may be such as a bolt. The nut is assembled on the bolt and is between the pressing member and the lifting assembly. The nut is for pushing the pressing member along the bolt.

According to one or more embodiments of the present disclosure, the wearable device further comprises a cover, a bracket, and an adjustable stud. The cover is affixed to a side of the casing member. The bracket is connected to the cover. The pressing member is disposed between the bracket and the supporting portion. The adjustable stud is liftable, being disposed on the bracket and connected to the pressing member. The adjustable stud is for adjusting a tilt angle of the pressing member to the supporting portion.

According to one or more embodiments of the present disclosure, the casing member of the wearable device further comprises at least one lug. A bore is located in the lug. The lifting assembly comprises a plate, at least one pillar, and at least one locking part. The plate is disposed in the casing member. The pillar is affixed to the plate and inserted in the bore. The locking part is fastened to one end of the pillar opposite to the plate. The elastic component is a spring assembled on the pillar and abuts with the bore and the locking part.

According to one or more embodiments of the present disclosure, the supporting portion of the casing member comprises a cushion.

Thus, with the features described in the above embodiments, the wearable device can be swiftly attached to a temple of any size and firmly attached thereon. Consequently, the wearable device is less likely to tremble, shift, or even separate from the glasses under an external force.

Provided above is merely a brief introduction of the problems to be solved, the technical means to solve the problem and the technical effects of the present disclosure. The specific details of the present disclosure are provided in the following embodiments and drawings.

BRIEF DESCRIPTION OF THE DRAWINGS

The disclosure can be more fully understood by reading the following detailed description of the embodiment, with reference made to the accompanying drawings as follows.

DETAILED DESCRIPTION

The following embodiments are disclosed with accompanying diagrams for a detailed description. For illustration clarity, many details of practice are explained in the following descriptions. However, it should be understood that these details of practice do not intend to limit the present disclosure. That is, these details of practice are not necessary for parts of embodiments of the present disclosure. Furthermore, for simplifying the drawings, some of the conventional structures and elements are shown with schematic illustrations.

Figure 1:
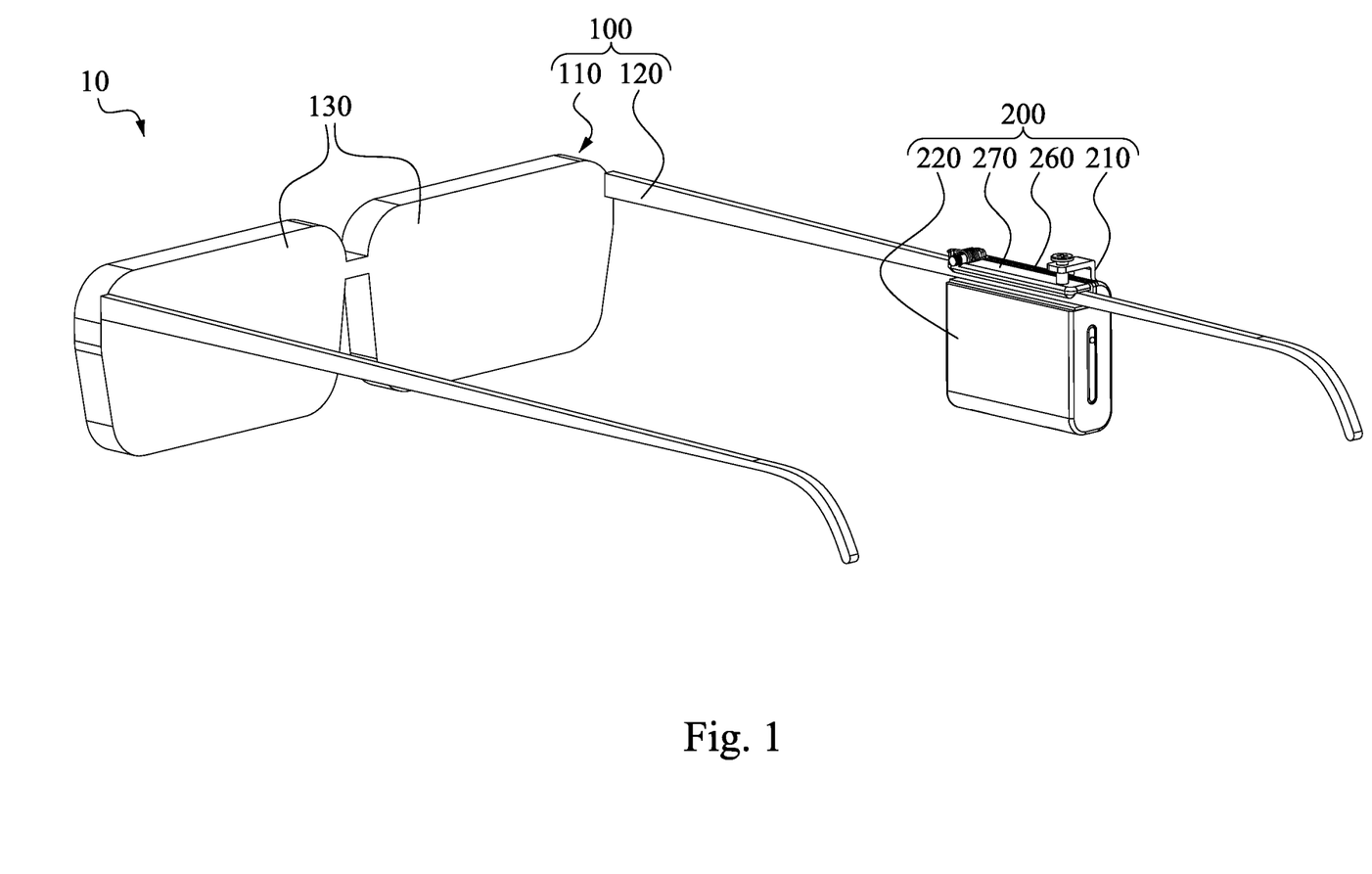
FIG. 1 is a perspective view of a wearable device attached to a pair of glasses according to an embodiment of the present disclosure.

FIG. 1 is a perspective view of an embodiment of a wearable device 200 attached to a pair of glasses 10. In this embodiment, as shown in FIG. 1, the glasses 10 comprise a frame 100. The frame 100 includes a rim 110 and two temples 120. Two lenses 130 are embedded in the rim 110. Each temple 120 is connected to the rim 110. The wearable device 200 may be removably attached to one of the temples 120.

It is understood that there are no certain limitations on the frame 100 of the glasses 10 in the present disclosure, and therefore details of the frame 100 of the glasses 10 are not further described herein. In addition, the wearable device 200 is not limited to be attached to the temple although the wearable device 200 described is illustrated to be attached to one temple of a pair of glasses in the present embodiment.

Figure 2:
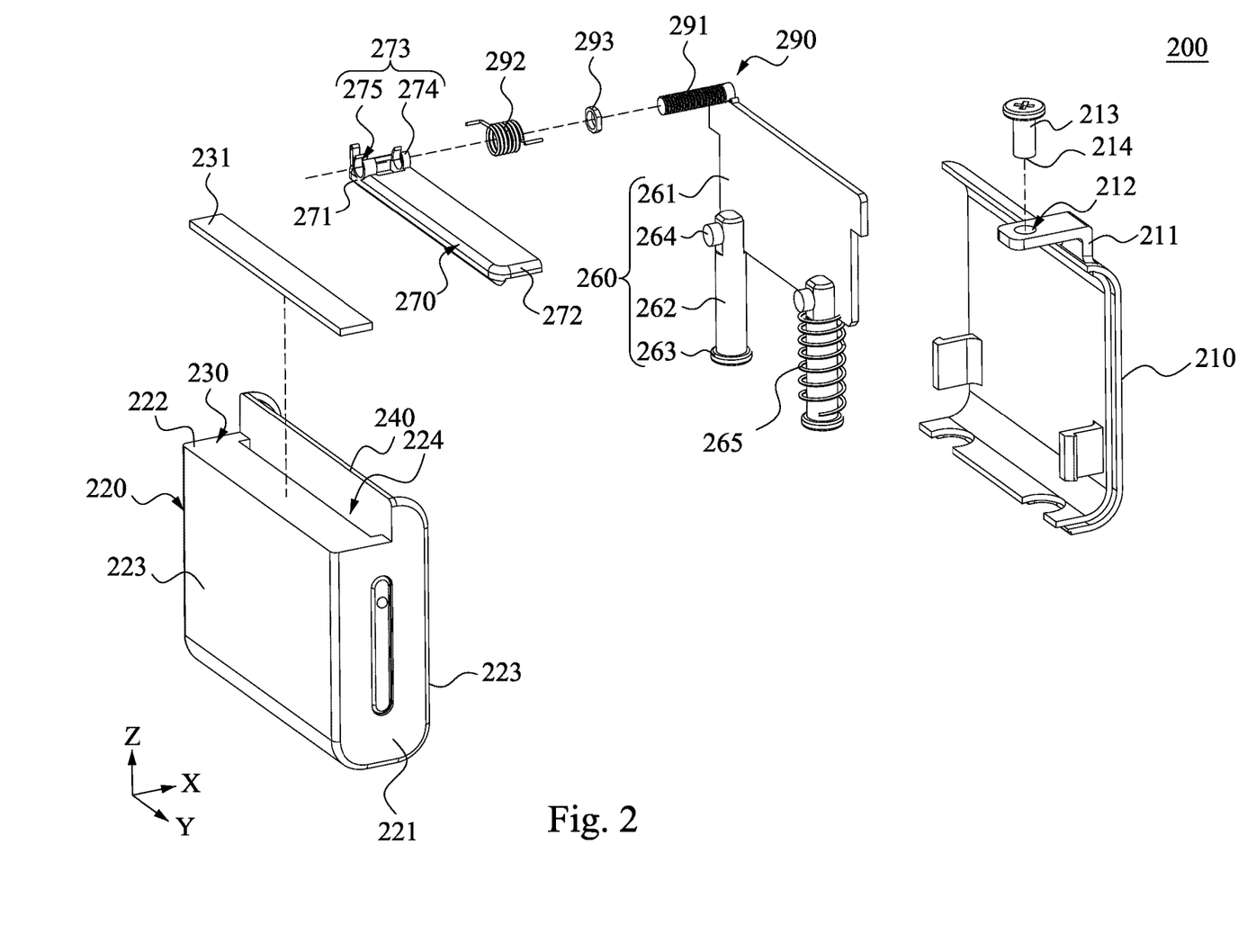
FIG. 2 is an exploded view of the wearable device of FIG. 1.
Figure 3:
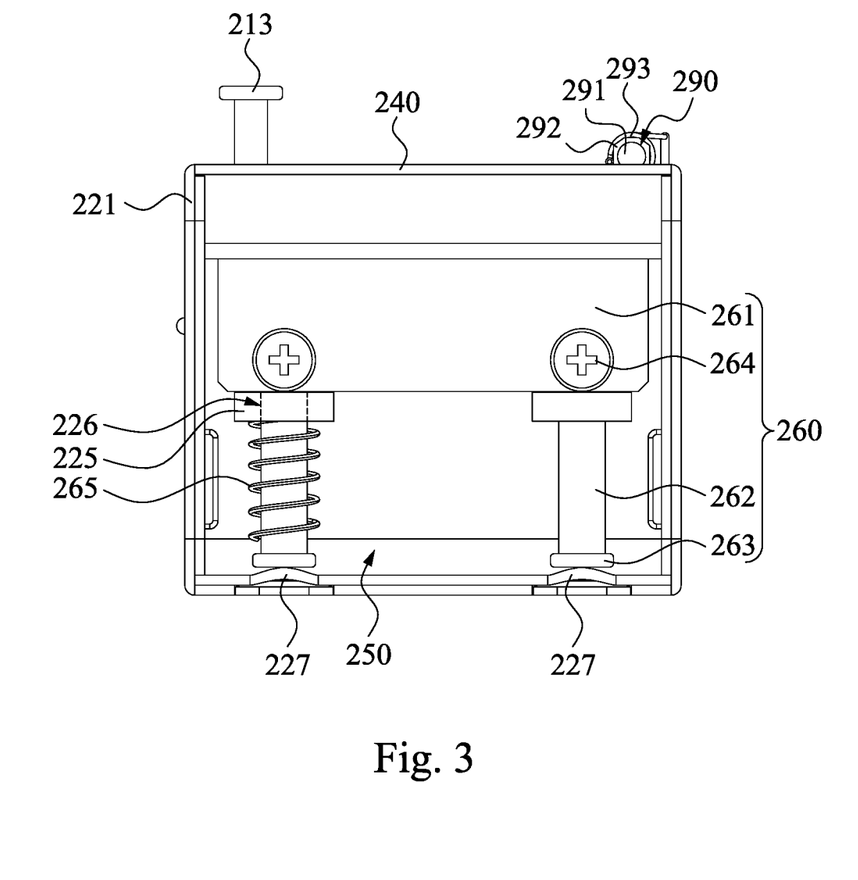
FIG. 3 is a front view of the wearable device of FIG. 1 omitting the cover.

FIG. 2 is an exploded view of the wearable device 200 of FIG. 1. FIG. 3 is a front view of the wearable device 200 of FIG. 1 omitting the cover 210. As shown in FIG. 2 and FIG. 3, the wearable device 200 comprises a cover 210, a casing member 220, a lifting assembly 260, an elastic component 265, and a pressing member 270. The casing member 220 has a supporting portion 230. The cover 210 is affixed to a side of the casing member 220. The lifting assembly 260 is housed in the casing member 220 and is liftable above the casing member 220. The casing member 220 and the lifting assembly 260 are connected by the elastic component 265. The pressing member 270 faces toward the supporting portion 230. The pressing member 270 is movably connected to the lifting assembly 260. The pressing member 270 is configured to move along with the lifting assembly 260.

Therefore, when the wearable device 200 is attached to one of the temples 120, the pressing member 270 and the lifting assembly 260 are constantly being pulled downward by a resilient force of the elastic component 265, such that the temple 120 is directly clamped between the pressing member 270 and the supporting portion 230. Consequently, the wearable device 200 is less likely to tremble, shift, or even separate from the glasses 10 under an external force.

In the present embodiment, as shown in FIG. 2 through FIG. 4A, the casing member 220 has a body 221, a protruding portion 240 and a cavity 250 (see FIG. 3). The body 221 has a top portion 222 and two sides 223. The top portion 222 is located between the sides 223. The supporting portion 230 is located at the top portion 222 of the body 221 and connected to one of the sides 223. The protruding portion 240 protrudes from the top portion 222 of the body 221, and is connected to another side 223 and the supporting portion 230. The cavity 250 is disposed at another side 223 of the body 221. The cover 210 is affixed to one side of the body 221, thereby covering the cavity 250 of the casing member 220. Therefore, an adjustable space 280 (see FIG. 4A) is defined by the pressing member 270, the protruding portion 240, and the supporting portion 230. The space 280 is for receiving one temple 120 of the frame 100. In addition, in the present embodiment, the supporting portion 230 of the casing member 220 has a cushion 231 (see FIG. 4A). The cushion 231 may be such as a foamed cushion or a rubber cushion but is not limited thereto.

In addition, the body 221 further comprises a narrow slit 224 and two lugs 225. The narrow slit 224 is formed at the supporting portion 230. Each lug 225 is disposed in the cavity 250 of the casing member 220, connected to an inner surface of the body 221, and spaced apart from each other. A bore 226 is located in each lug 225. The lifting assembly 260 comprises a plate 261, two pillars 262 and two locking parts 263. The plate 261 is disposed in the cavity 250 of the casing member 220 and extended out from the narrow slit 224. In other words, one side of the plate 261 protrudes from the casing member 220 through the narrow slit 224, and another side of the plate 261 is located in the cavity 250 of the casing member 220. Each pillar 262 is affixed to another side of the plate 261, such as by means of being fastened to said another side of the plate 261 via a screw 264. Each pillar 262 may further be inserted in one of the bore 226, such that the pillar 262 may move linearly along the bore 226. The locking part 263 is fastened on one end of the pillar 262 opposite to the plate 261 and abuts with a raised portion 227 in the cavity 250 (see FIG. 3). The elastic component 265 is assembled on the pillar 262, located between and abuts with the lug 225 (or bore 226) and the locking part 263. The elastic component 265 may be such as a spring but is not limited thereto.

In the present embodiment, as shown in FIG. 2, the pressing member 270 is pivotally connected to the lifting assembly 260, such that the pressing member 270 can rotate relative to the lifting assembly 260. More specifically, the lifting assembly 260 comprises a pivot 290 and a torsional spring 292. The pressing member 270 is rotatably connected the lifting assembly 260 via the pivot 290, such that the pressing member 270 can rotate relative to the lifting assembly 260 along an axial direction (such as X-axis) of the pivot 290. The torsional spring 292 coils around the pivot 290. The lifting assembly 260 and the pressing member 270 are connected by the torsional spring 292. In the present embodiment, the pressing member 270 has a long plate shape and extends towards a longitudinal direction (such as Y-axis). The pressing member 270 comprises a first end 271 and a second end 272. The first end 271 is opposite to the second end 272. The lifting assembly 260 is rotatably connected to the first end 271 of the pressing member 270 via the pivot 290. One end of the torsional spring 292 is connected to one side of the lifting assembly 260, while another end of the torsional spring 292 is connected to the first end 271 of the pressing member 270. Therefore, when a force is exerted on the pressing member 270, the pressing member 270 may rotate and thereby causing a deformation of the torsional spring 292, such that a resilient force is generated in the torsional spring 292. On the other hand, when the force exerted on the pressing member 270 is removed, the resilient force generated in the torsional spring 292 is released, such that the pressing member 270 is rotated back to its original position by the resilient force.

It is understood that the axial direction (such as X-axis) of the pivot 290 is orthogonal to a longitudinal direction (such as Y-axis) of the pressing member 270 and a lifting direction (such as Z-axis) of the lifting assembly 260.

In addition, the wearable device 200 further includes a bracket 211 and an adjustable stud 213. The bracket 211 has a bent shape. One end of the bracket 211 is connected to the cover 210, and another end of the bracket 211 has a screw hole 212 aligned with the pressing member 270. The pressing member 270 is located between said another end of the bracket 211 and the supporting portion 230. The adjustable stud 213 is liftable and is disposed in the screw hole 212. A bottom surface 214 of the adjustable stud 213 is connected to the second end 272 of the pressing member 270. The adjustable stud 213 may exert a force to rotate the pressing member 270, thereby adjusting a tilt angle between the pressing member 270 and the supporting portion 230 for fitting a tilted surface of the temples 120.

In the embodiment, the pressing member 270 is slidably connected to the pivot 290 of the lifting assembly 260, such that the pressing member 270 is laterally slidable along the axial direction (such as X-axis) of the pivot 290 to fit various widths of the temples 120. More specifically, the pressing member 270 has a sleeve coupling 273. The sleeve coupling 273 may be such as a C-shaped elastic frame 274 having a chute 275. The pivot 290 is slidably located in the chute 275. In addition, the wearable device 200 further includes a nut 293. The pivot 290 may be such as a bolt 291. The nut 293 is assembled on the bolt 291 and located between the pressing member 270 and the lifting assembly 260. For example, the nut 293 is located between the sleeve coupling 273 and the lifting assembly 260. The nut 293 is for pushing the pressing member 270 to adjust a distance between the pressing member 270 and the lifting assembly 260.

Figure 4A:
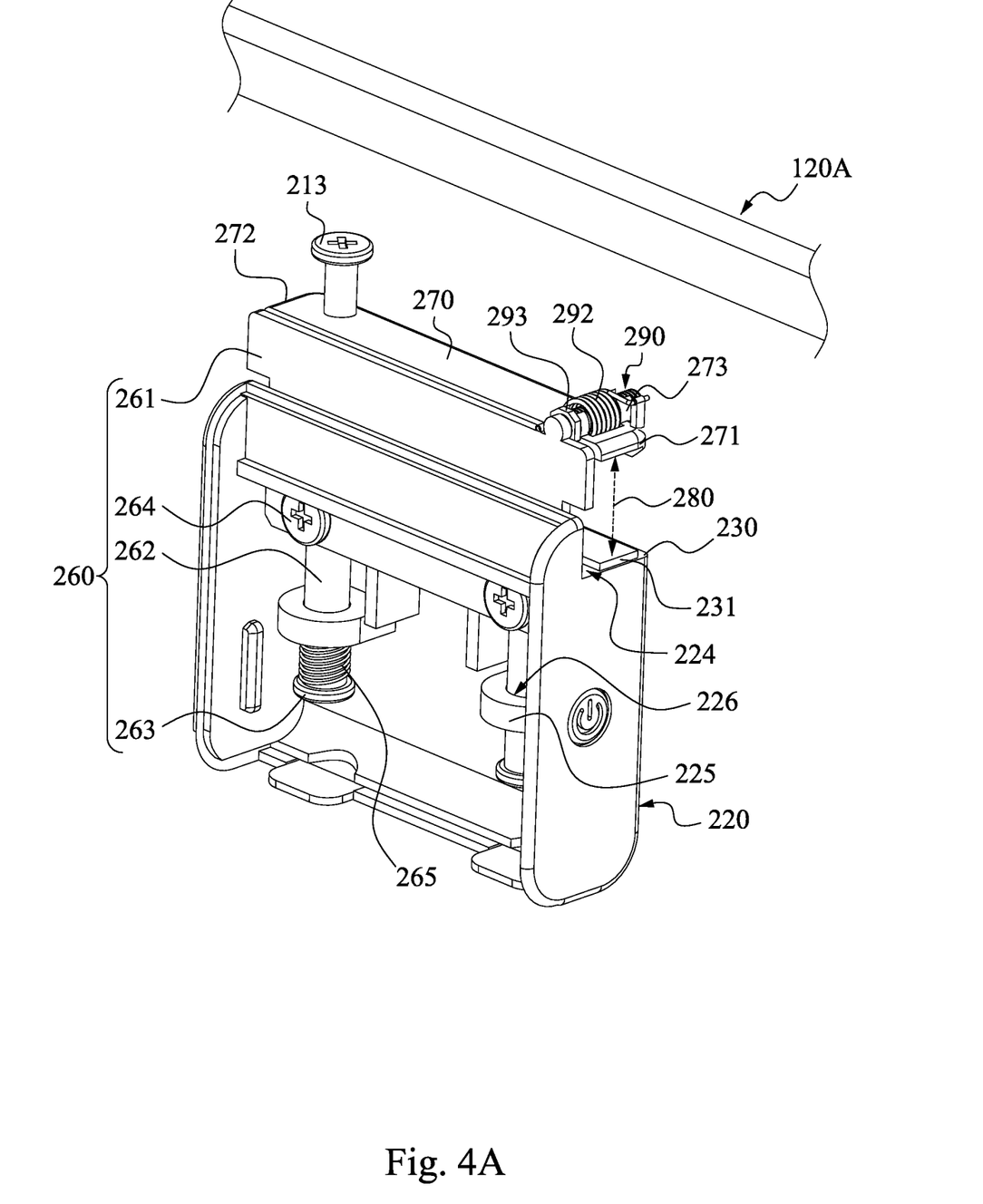
FIG. 4A through FIG. 4C are schematic diagrams illustrating the wearable device of FIG. 1 under different operation states.
Figure 4B:
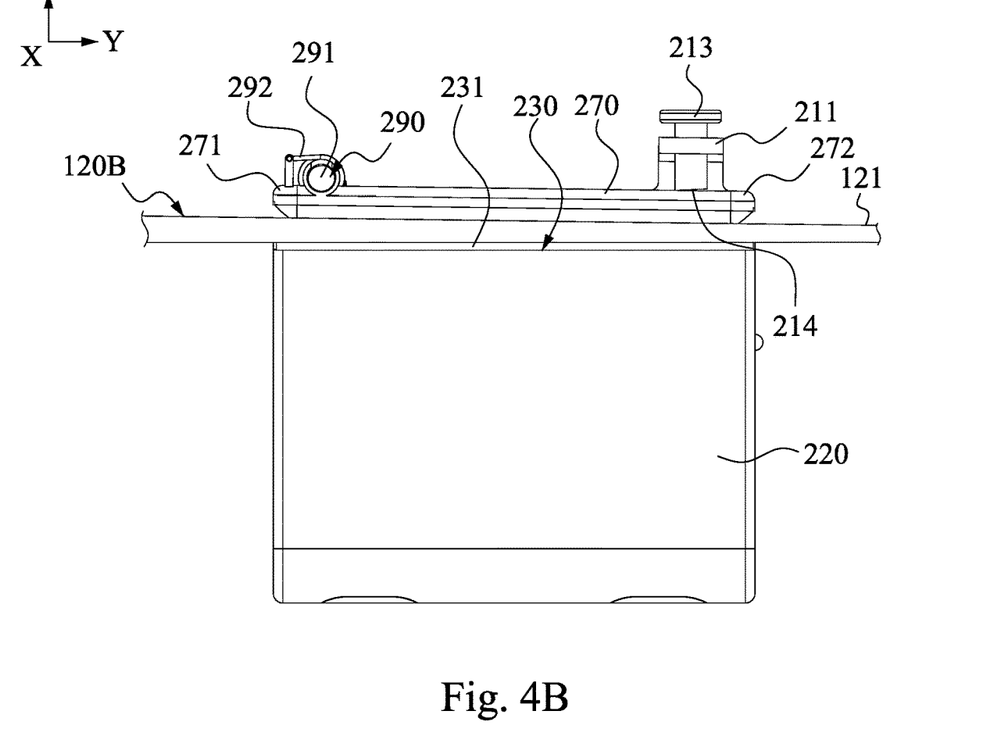
Figure 4C:
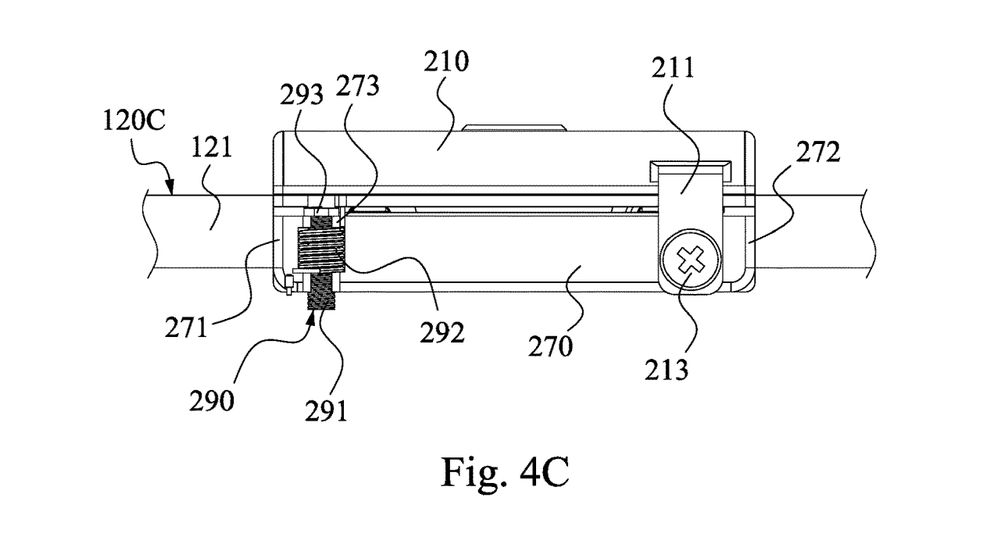

FIG. 4A through FIG. 4C are schematic diagrams illustrating the wearable device 200 of FIG. 1 under different operation states. As shown in FIG. 2 and FIG. 4A, when a user attempts to attach the wearable device 200 to one of the temples 120A, the user may pull up the pressing member 270 in a direction away from the supporting portion 230 (such as Z-axis, upward), such that the space 280 is adjusted to match the thickness of the temples 120A. In this time, the elastic component 265 is compressed by the lifting assembly 260 which is moved along with the pressing member 270. Therefore, when the temple 120A is inserted between the pressing member 270 and the supporting portion 230, the resilient force of the elastic component 265 constantly pulls down the pressing member 270, such that the temple 120A is firmly clamped between the pressing member 270 and the supporting portion 230.

As shown in FIG. 2 and FIG. 4B, a user may rotate the adjustable stud 213 when a temple 120B is clamped between the pressing member 270 and the supporting portion 230, such that the adjustable stud 213 may move downward and thereby pushing the second end 272 of the pressing member 270, causing the pressing member 270 to rotate in a certain angle around the axial direction (such as X-axis) of the pivot 290, thereby matching a tilted surface of the temple 120B. Consequently, the pressing member 270 is more closely fit to the surface of the temple 120B. In this time, the torsional spring 292 is deformed, and a resilient force is generated in the torsional spring 292. On the other hand, the user may rotate the adjustable stud 213 in a reverse direction, such that the adjustable stud 213 may move upward, thereby the resilient force generated in the torsional spring 292 is released and thereby rotates the pressing member 270 in an angle to fit a tilted top surface of the temple 1208.

As shown in FIG. 2 and FIG. 4C, when a temple 120C is clamped between the pressing member 270 and the supporting portion 230, the user may rotate the nut 293 to laterally push the pressing member 270 along a direction (such as X-axis) to match a width of the top surface 121 of the temple 120C.

In summary, the wearable device provided in the present embodiment can adapt to various temples despite different widths, thicknesses, or surface inclination of the temples. The wearable device can be swiftly attached to various temples and firmly attached thereon, and therefore the wearable device is less likely to tremble, shift, or even separate from the glasses under an external force.

The present disclosure should not be limited to the embodiments provided herein. It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. A wearable device, attachable to a temple of a pair of glasses, comprising:
   a casing member having a supporting portion and at least one lug disposed therein, the lug having a bore;
   a lifting assembly housed in the casing member and being liftable above the casing member, wherein the lifting assembly comprises a plate, at least one pillar and at least one locking part, wherein the plate is disposed in the casing member, the pillar is affixed to the plate and inserted in the bore, the locking part is fastened to an end of the pillar opposite to the plate;
   an elastic component connecting the casing member and the lifting assembly, wherein the elastic component is a spring assembled on the pillar and abuts with the bore and the locking part; and
   a pressing member facing toward the supporting portion, wherein the pressing member is movably connected to the lifting assembly and is configured to move along with the lifting assembly, whereby the temple is capable of being clamped between the pressing member and the supporting portion.

2. The wearable device of claim 1, wherein the lifting assembly comprises a pivot connected to a side of the lifting assembly, and the pressing member is rotatably connected to the lifting assembly via the pivot,
   wherein an axial direction of the pivot is orthogonal to a lifting direction of the lifting assembly.

3. The wearable device of claim 2, further comprising a torsional spring coiling around the pivot, wherein the pressing member comprises a first end and a second end opposite thereto, the lifting assembly rotatably connecting the first end of the pressing member via the pivot, the torsional spring connecting the lifting assembly and the first end of the pressing member, wherein the axial direction of the pivot is orthogonal to a longitudinal direction of the pressing member.

4. The wearable device of claim 2, wherein the pressing member is slidably connected to the lifting assembly, such that the pressing member is laterally slidable relative to the lifting assembly.

5. The wearable device of claim 4, wherein the pressing member is slidably connected to the pivot of the lifting assembly, such that the pressing member is laterally slidable along the axial direction of the pivot.

6. The wearable device of claim 5, wherein the pressing member has a sleeve coupling with a chute, and the pivot is slidably located in the chute.

7. The wearable device of claim 6, further comprising a nut disposed between the pressing member and the lifting assembly, wherein the pivot is a bolt and the nut is assembled on the bolt, the nut is for pushing the pressing member along the bolt.

8. The wearable device of claim 2, further comprising:
   a cover affixed to a side of the casing member;
   a bracket connected to the cover, wherein the pressing member is disposed between the bracket and the supporting portion; and an adjustable stud disposed on the bracket and is liftable, wherein the adjustable stud is connected to the pressing member, the adjustable stud is for adjusting a tilt angle of the pressing member to the supporting portion.

9. The wearable device of claim 1, wherein the supporting portion of the casing member comprises a cushion.

* * * * *